US007114814B2

(12) United States Patent
Abe et al.

(10) Patent No.: US 7,114,814 B2
(45) Date of Patent: Oct. 3, 2006

(54) PROJECTOR HAVING AN ILLUMINANCE DETECTOR

(75) Inventors: Hiroki Abe, Suwa (JP); Tomoo Fujimori, Suwa (JP); Motoo Takahashi, Tokyo (JP); Kenji Samejima, Tokyo (JP)

(73) Assignees: Chinontec Kabushiki Kaisha, Nagano (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/328,082

(22) Filed: Jan. 10, 2006

(65) Prior Publication Data

US 2006/0109429 A1    May 25, 2006

Related U.S. Application Data

(62) Division of application No. 10/703,166, filed on Nov. 7, 2003, now Pat. No. 7,021,772.

(30) Foreign Application Priority Data

Nov. 7, 2002    (JP) .............................. 2002-323342

(51) Int. Cl.
*G03B 21/14*    (2006.01)
*G03B 21/20*    (2006.01)
*G02F 1/1335*   (2006.01)

(52) U.S. Cl. ........................ 353/97; 353/100; 353/102; 349/5; 349/7

(58) Field of Classification Search .................. 353/69, 353/70, 74, 75, 76, 77, 79, 84, 97, 98, 100, 353/101, 88, 102; 349/5, 7; 348/742, 743, 348/771; 355/67
See application file for complete search history.

(56) References Cited

U.S. PATENT DOCUMENTS 2,742,817 A    4/1956    Altman
(Continued)

FOREIGN PATENT DOCUMENTS

JP            06059233            3/1994
(Continued)

*Primary Examiner*—Melissa Jan Koval
(74) *Attorney, Agent, or Firm*—Morrison & Foerster LLP

(57) ABSTRACT

The invention provides a projector having a light source, a display device to modulate light emitted from the light source, a lens device to project light emitted from the light source via the display device, wherein the lens device has a diaphragm mechanism formed having an aperture, an ambient light illuminance detector to measure illuminance of ambient light, a projected image illuminance detector to measure illuminance of an image projected on the screen, an illuminance comparator to compare an illuminance detected by the ambient light illuminance detector and an illuminance detected by the projected image illuminance detector, and a diaphragm mechanism/image signal controller to control an intensity of image signals input into the display device and to control a size of an opening of the aperture of the diaphragm mechanism in accordance with a result of comparison by the illuminance comparator.

4 Claims, 13 Drawing Sheets

U.S. PATENT DOCUMENTS

| | | | | |
|---|---|---|---|---|
| 5,121,151 | A | * | 6/1992 | Kawabata et al. .......... 396/122 |
| 5,742,436 | A | | 4/1998 | Furter ........................ 359/727 |
| 5,788,354 | A | * | 8/1998 | Murai et al. .................. 353/97 |
| 6,220,730 | B1 | | 4/2001 | Hewlett et al. |
| 6,592,227 | B1 | * | 7/2003 | Ouchi et al. .................. 353/97 |
| 6,598,979 | B1 | * | 7/2003 | Yoneno ...................... 353/122 |
| 6,619,804 | B1 | | 9/2003 | Davis .......................... 353/98 |
| 6,631,995 | B1 | * | 10/2003 | Stanton et al. ................ 353/84 |
| 6,646,716 | B1 | | 11/2003 | Ramanujan .................. 355/67 |
| 6,877,865 | B1 | | 4/2005 | English et al. |
| 6,923,546 | B1 | * | 8/2005 | Kurematsu ................... 353/97 |
| 6,950,098 | B1 | * | 9/2005 | Brabander et al. .......... 345/207 |

FOREIGN PATENT DOCUMENTS

JP  08043729  2/1996

* cited by examiner

PROJECTOR HAVING AN ILLUMINANCE DETECTOR

REFERENCE TO RELATED APPLICATION

This application is a division of Ser. No. 10/703,166, filed Nov. 7, 2003 now U.S. Pat. No. 7,021,772, which is hereby incorporated by reference.

FIELD OF THE INVENTION

The present invention relates to a projector for projecting light that has been modulated by a display device.

BACKGROUND OF THE INVENTION

Various projectors that are adapted to guide via a lighting optical system to a display device, such as liquid crystal panels, light emitted from a light source and project said light onto a screen via a lens device after modulating the light by the display device are known conventionally (e.g. Japanese Unexamined Patent Application Publication No. Hei-8-43729). In order to improve the contrast of a projected image, the lens device of a conventional projector may be provided with a diaphragm mechanism which has a circular aperture and is positioned within a group of lenses.

In the case of projectors that use liquid crystal panels or the like as the display device, it is necessary to ensure telecentricity between the display device and the lens device. Therefore, in order to improve the contrast of a projected image while limiting the reduction of telecentric properties, the entire lens device has to be designed to permit adjusting of the aperture diameters of the lens frames that secure the respective lenses.

SUMMARY OF THE INVENTION

However, setting the aperture diameters of all the lens frames supporting the respective lenses of the entire lens device is complicated and makes the reduction of production costs difficult.

In order to solve the above problem, an object of the present invention is to provide a lens device and a projector which facilitate the improvement of image quality.

The lens device of this invention is a lens device of a projector for projecting light that has been modulated and emitted by a display device, wherein the lens device is arranged telecentric to rays of light emitted from said display device and provided with a diaphragm mechanism having an aperture at such a position that the principal rays emitted from various locations on the display device intersect with the optical axis.

With such a configuration, this lens device is capable of increasing the F-number (in other words reducing the view angle) so as to shut out the light that passes near the perimeter of the lens, which is the area prone to the influence of lens aberration. By thus forming a projection image of the light that passes near the center of the lens and is therefore less prone to lens aberration, this lens device is capable of improving the contrast of the projected image. As the lens device is arranged so as to be telecentric to rays of light emitted from the display device, the principal rays of light emitted from various locations of the display device converge at a single point and intersect with the optical axis. Providing the diaphragm mechanism with an aperture at such a position that the principal rays intersect with the optical axis permits rays of light emitted from various locations on the display device to be shut out in a symmetrical manner with respect to the optical axis, thereby limiting reduction in telecentricity and, consequently, easily ensuring both telecentricity and improved contrast.

In the lens device of this invention, the shape of the aperture of the diaphragm mechanism is determined in accordance with contrast characteristics with respect to directions and angles of incidence to the display device so as to ensure a sufficiently high contrast. Compared with a configuration that includes a circular aperture, such a lens device is capable of limiting reduction in illuminance of a projected image and also easier to improve the contrast of a projected image. The diaphragm mechanism may also be designed such that the size of its aperture is adjustable. The configuration described above facilitates adjustment of the contrast and the brightness of a projected image.

A projector according to this invention includes a light source, a display device adapted to modulate light emitted from the light source, and a lens device of this invention as described above which is adapted to project light emitted from said light source via the display device. As a result of inclusion of such a lens device, this projector easily ensures both telecentricity and improved contrast.

A projector of this invention includes a light source, a display device adapted to modulate light emitted from the light source, a lens device which is provided with a diaphragm mechanism and adapted to project light emitted from said light source via said display device, an image signal intensity detecting means for detecting and evaluating the intensity of image signals to be input into the display means, a diaphragm mechanism drive control means adapted to drive the diaphragm mechanism so as to reduce the size of the aperture of the diaphragm mechanism when the image signal intensity detecting means ascertains that the intensity of the image signal is lower than a given level, and an image signal control means adapted to increase the intensity of the image signal when the image signal intensity detecting means ascertains that the intensity of the image signal is lower than a given level.

Should the intensity of image signals input into the display device be at a low level, a projector having the configuration described above is capable of increasing the contrast of a projected image while maintaining its illuminance by reducing the size of the opening of the aperture of the diaphragm mechanism and increasing the intensity of the image signals.

A projector claimed of this invention includes a light source, a display device adapted to modulate light emitted from the light source, a lens device which is provided with a diaphragm mechanism and adapted to project onto a screen light emitted from said light source via said display device, an object detecting means for detecting an object between the lens device and the screen, and a diaphragm mechanism drive control means adapted to drive the diaphragm mechanism so as to reduce the size of the opening of the aperture of the diaphragm mechanism when the object detecting means detects an object between the lens device and the screen. Should there be an object between the lens device and the screen, a projector having this configuration is capable of limiting the impact light has on the object by reducing the dimension of the aperture of the diaphragm mechanism.

A projector of this invention includes a light source, a display device adapted to modulate light emitted from the light source, a lens device which is provided with a diaphragm mechanism and adapted to project onto a screen light emitted from said light source via said display device, an ambient light illuminance detecting means for measuring ambient light illuminance, a projected image illuminance detecting means for measuring the illuminance of an image projected on the screen, an illuminance comparing means for comparing an illuminance detected by the ambient light illuminance detecting means and an illuminance detected by the projected image illuminance detecting means, and a diaphragm mechanism/image signal control means for controlling intensity of image signals input into the display device and the size of the opening of the aperture of the diaphragm mechanism in accordance with a result of comparison by the illuminance comparing means. Should the illuminance of an image projected on the screen not be sufficiently intense with respect to the illuminance in the room, this projector is capable of reducing the size of the opening of the diaphragm mechanism so as to increase the contrast of the projected image and setting the intensity of the image signals at a high level so as to limit reduction in the illuminance of the projected image. The lens device may be arranged so as to be telecentric to rays of light emitted from the display device and provided with a diaphragm mechanism whose aperture is positioned so that the principal rays of light emitted from the display device intersect with the optical axis.

As the lens device is arranged telecentric to rays of light emitted from the display device, the principal rays of light emitted from various locations of the display device converge at a single point and intersect with the optical axis. Therefore, by providing the diaphragm mechanism with an aperture at such a position that the principal rays intersect with the optical axis, rays of light emitted from various locations on the display device can be shut out in a symmetrical manner with respect to the optical axis so that reduction in telecentricity is limited. Thus, this projector easily ensures both telecentricity and improved contrast. In this type of projector, the shape of the aperture of the diaphragm mechanism is determined in accordance with contrast characteristics with respect to directions and angles of incidence to the display device so as to ensure a sufficiently high contrast. Compared with a configuration that includes a circular aperture, this projector facilitates improvement of the contrast of a projected image while limiting reduction in illuminance of the projected image. This projector may also include a display device which is comprised of liquid crystal panels. With the configuration as above, such a projector facilitates the improvement of image quality by improving the contrast of the image while ensuring telecentricity even in cases where the projector includes liquid crystal panels having contrast characteristics that are polarized with respect to the direction and angle of incidence.

DETAILED DESCRIPTION OF THE PREFERRED EMBODIMENT

Next, a lens device and a projector according to an embodiment of the present invention are explained hereunder, referring to relevant drawings.

Figure 1:
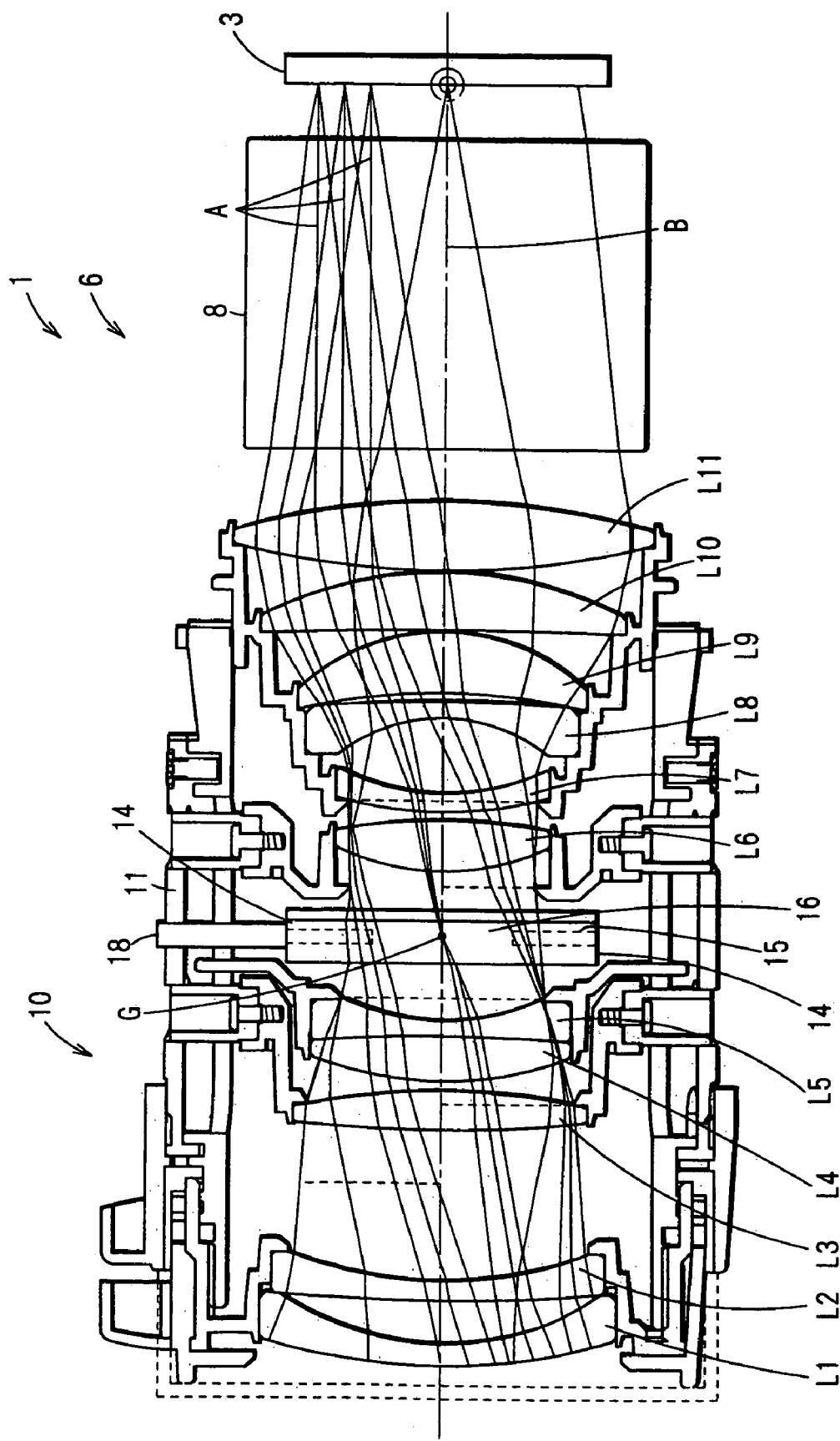
FIG. 1 is a schematic illustration of a part of an embodiment of a projector provided with a lens device according to the present invention.

Referring to FIG. 1, numeral 1 denotes a projector, which includes a light source (not shown), three liquid crystal panels (LCD) 3, and an optical system. The liquid crystal panels 3 serves as a display device, which functions as a modulating means to modulate light emitted from the light source. The optical system functions to project light emitted from the light source via the liquid crystal panels 3 onto a screen S. The optical system has a lighting optical system and a lens device 6. The lighting optical system includes a dichroic mirror or a similar device to guide to the liquid crystal panels 3 light emitted from the light source. The lens device 6 serves as a projection optical system for projecting onto the screen S rays of light emitted from the liquid crystal panels 3. The lens device 6 has a dichroic prism 8 and a projection lens 10. The dichroic prism 8 serves to combine color light, i.e. red (R), green (G), and blue (B), emitted from the plural number of liquid crystal panels 3. The projection lens 10 serves to enlarge and project light that has exited from the dichroic prism 8.

The projection lens 10 includes a lens barrel 11, in which the first through fifth lens L1–L5, a diaphragm mechanism 14, and the sixth through eleventh lens L6–L11 are arranged along an optical axis B in this order from the end that is close to the screen S.

The lenses L1–L11 are arranged telecentric to light emitted from the liquid crystal panels 3. As a result, of the rays of light that have passed through various locations, i.e. pixels, on the liquid crystal panels 3, principal rays A, which are rays of light orthogonal to the surfaces of the liquid crystal panels 3, converge at a point G on the optical axis B. In other words, the principal rays A, which are rays of light emitted parallel to the optical axis B, intersect with the optical axis B at the point G.

Figure 2:
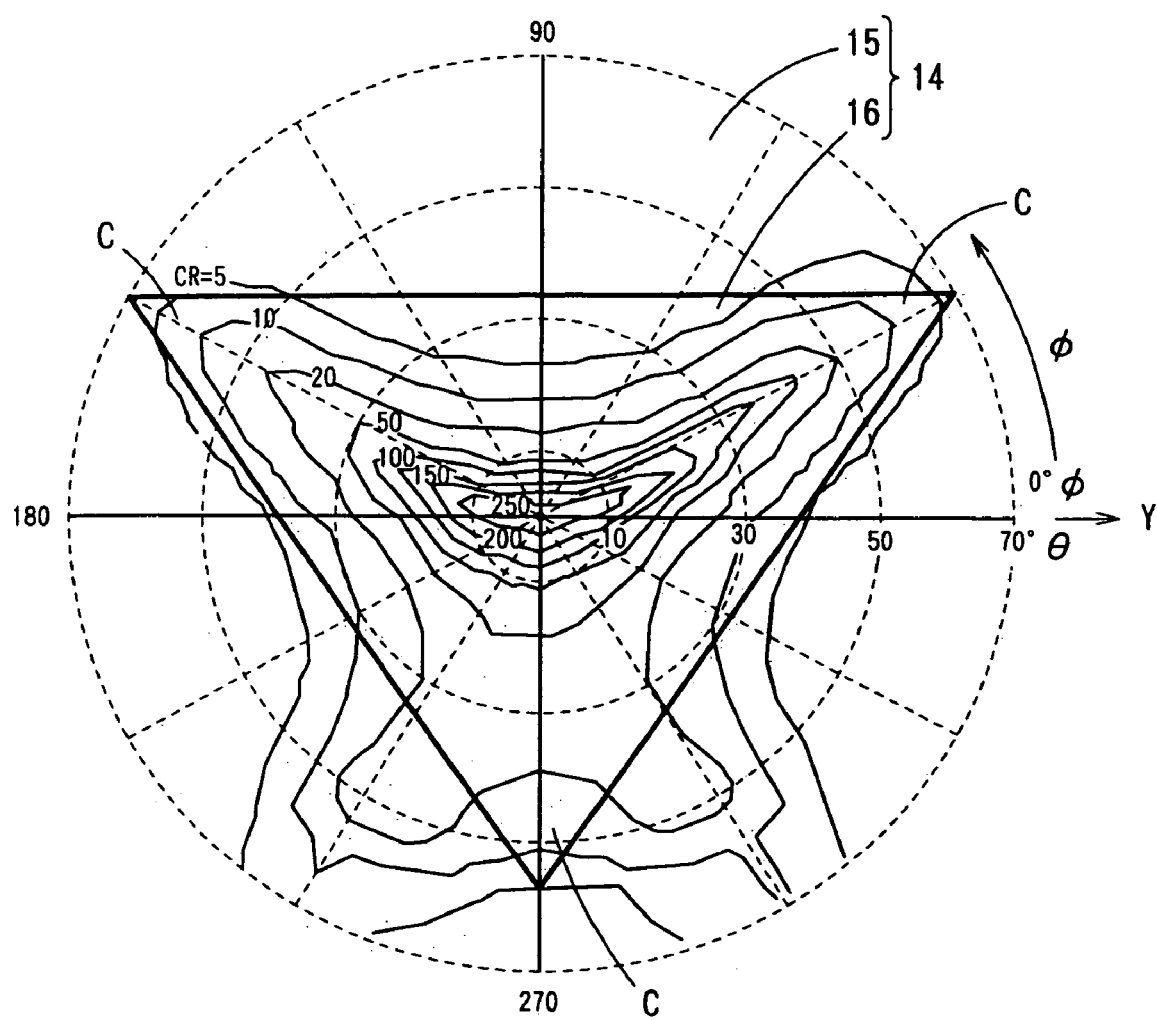
FIG. 2 is a schematic illustration of a first embodiment of a diaphragm mechanism of said lens device.

As shown in FIGS. 1 and 2, the diaphragm mechanism 14 of the projection lens 10 includes a shield section 15 for blocking light, an aperture 16 for passing light, and an operating means 18. The aperture 16 is positioned so that the optical axis B passes through the aperture 16 and that the point G, at which the principal rays A converge, is located in the aperture 16. The aperture 16 does not have a circular shape; its shape is determined in accordance with field angle characteristics of the liquid crystal panels 3, in other words contrast characteristics with respect to directions and angles of incidence. In the case of the present embodiment, the aperture 16 is formed in the shape of an equilateral triangle. The diaphragm mechanism 14 is designed so that the size of the opening of its aperture 16 can be adjusted by operating the operating means 18 manually or automatically so as to adjust the shield section 15 and the aperture 16. In the case of the embodiment, the shield section 15 and the aperture 16 are adjusted so as to change the size of the aperture 16 without changing its shape.

As described above, the projection lens 10 of the embodiment is provided with the diaphragm mechanism 14. Therefore, by increasing the F-number of the projection lens 10 (in other words by reducing the view angle), more of the stray light inside the lens barrel 11, i.e. the illuminating light reflected by the inner surface of the lens barrel 11, is permitted to enter, and the light that passes near the perimeter of the lens, which is the area prone to the influence of lens aberration, is shut out. As a result, a projection image is formed of the light that passes near the center of the lens and is therefore less prone to the influence of incidence of stray light or lens aberration. The embodiment described above is thus capable of providing an image with an improved contrast. Limiting the amount of light by means of the diaphragm mechanism 14 results in darker projection images.

The diaphragm mechanism 14 for adjusting contrast is disposed at such a location that the principal rays A intersect with the optical axis B. This configuration enables the appropriate disposition of the diaphragm mechanism 14 without impairing its telecentric property. With a projection type display, particularly in the case of a projector 1 which uses liquid crystal panels 3 as the display device, it is important to ensure the telecentricity of light between the display device and the projection lens 10. Therefore, the projection lens 10 of the lens device 6 has such a structure that the principal rays A of the light emitted from the pixels of the liquid crystal panels 3 are telecentric, in other words parallel to the optical axis B. As the diaphragm mechanism 14 of the embodiment described above is disposed at such a location that the principal rays A intersect with the optical axis B of the optical system, rays of light emitted from the pixels can be shut out in a relatively symmetrical manner with respect to the optical axis B. For example, the upper light beam and the lower light beam from each pixel can be shut out symmetrically with respect to the optical axis B. Because of this feature, the lens device 6 of the embodiment is capable of improving contrast of projected images without reducing the telecentric property.

As a single diaphragm mechanism 14 is sufficient to obtain a large F-number, it is easy to achieve two things at the same time, i.e. setting F-number (in other words contrast) and ensuring telecentricity, without the necessity of adjusting the aperture diameter of each lens frame of the entire lens device. The present embodiment is therefore effective in reducing production costs of the lens device.

As the diaphragm mechanism 14 is provided with an operating means 18 that is capable of adjusting the size of the opening of the aperture 16, a desired image quality can be easily achieved by adjusting the balance between the contrast and the brightness of the image when the device is in use or when the aperture is adjusted in the production process or in any other occasion. The operating means 18 may be provided in various forms; for example, it can be formed as a lever to be rotated around the lens barrel 11.

The shape of the aperture 16 of the diaphragm mechanism 14 is determined in accordance with field angle characteristics of the liquid crystal panels 3, i.e. contrast characteristics with respect to directions and angles of incidence (in the case of the present embodiment, the aperture 16 is formed in the shape of an equilateral triangle). This feature offers improved contrast while limiting reduction in illuminance of a projected image.

The diaphragm mechanism 14 may be provided with a driving means, such as a motor, so that the size of the opening of the aperture 16 can be adjusted by using the driving force of the driving means. An explanation is given of the structures of the second through fifth embodiments of the invention, each of which has such a driving means to drive the diaphragm mechanism 14.

Although not shown in the drawings, the second embodiment calls for the operator of the projector 1 to drive a motor (not shown), which serves as the aforementioned driving means, by operating a driving switch of the motor while watching an image projected on the screen S so as to achieve a desired brightness and contrast of the projected image to improve the image quality.

The third embodiment of the invention calls for improving the image quality by automatically adjusting the size of the aperture 16 of the diaphragm mechanism 14 and the intensity of image signals in accordance with the intensity level of image signals and brightness of an image projected on the screen S.

Figure 3:
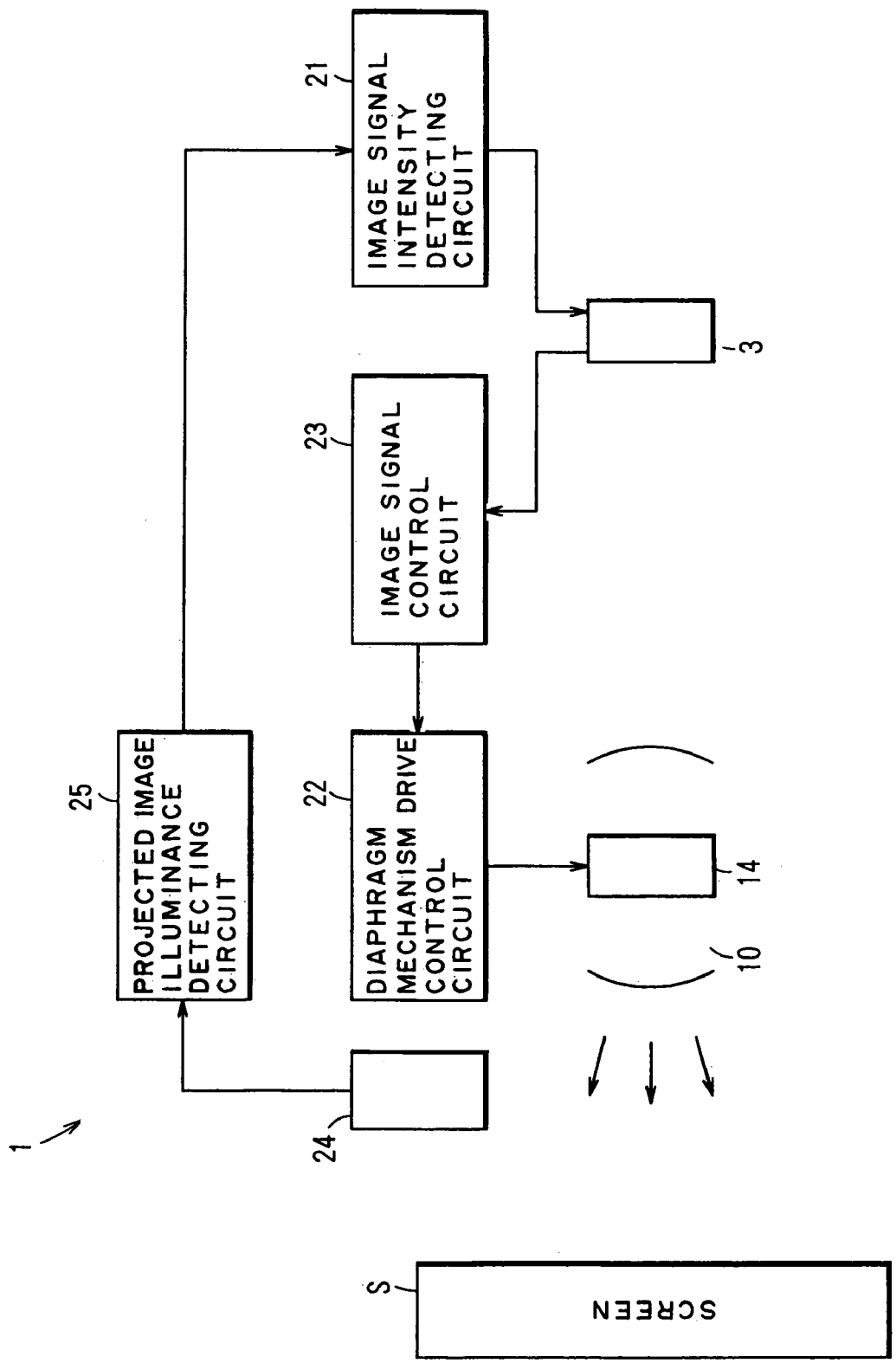
FIG. 3 is a schematic illustration of a second embodiment of a projector of the invention.

As shown in FIG. 3, the projector 1 of the third embodiment includes an image signal control circuit 21, a diaphragm mechanism drive control circuit 22, an image signal intensity detecting circuit 23, and a projected image illuminance detecting circuit 25. The image signal control circuit 21 serves as an image signal control means for controlling image signals to be input into the liquid crystal panels 3, which collectively serve as a display device. The diaphragm mechanism drive control circuit 22 serves as a diaphragm mechanism drive control means for changing the area of the aperture 16 of the diaphragm mechanism 14 by controlling the diaphragm mechanism 14. The image signal intensity detecting circuit 23 serves as an image signal intensity detecting means for detecting and evaluating the intensity of image signals to be input into the liquid crystal panels 3. The projected image illuminance detecting circuit 25 serves as a projected image illuminance detecting means for detecting brightness of images projected on the screen S via photoelectric elements 24. The photoelectric elements 24 serve as a light receiving section. According to the intensity level of image signals detected by the projected image illuminance detecting circuit 25, the image signal control circuit 21 controls the intensity of image signals input into the liquid crystal panels 3, and the diaphragm mechanism drive control circuit 22 adjusts the size of the opening of the aperture 16 by driving the motor of the diaphragm mechanism 14.

The projector 1 of the third embodiment described above is designed such that when the intensity of the image signals on the screen S except for the perfect black portion, in other words the image signals that form an projected image, is lower than a given level, the motor is driven so as to reduce the size of the opening of the aperture 16 of the diaphragm mechanism 14, while the intensity of the image signals input to the liquid crystal panels 3 is increased so that the illuminance of the projected image, which has decreased as a result of the reduction of the size of the opening of the aperture 16, is returned to the level of illuminance prior to the reduction of the opening.

The term "the perfect black portion" mentioned above refers to the part of the screen S that corresponds to the part displayed as "black" on the liquid crystal panels 3, which is the portion where light has passed through liquid crystal cells of the liquid crystal panels 3 but failed to pass through analyzers. In cases where the part displayed as "black" on the liquid crystal panels 3 is capable of completely shutting out light from the light source, the illuminance of the perfect black portion depends on the brightness of the ambient light around the screen S, such as light in the room. In reality, however, the liquid crystal panels 3 are unable to shut out light completely even in a black-display state, and leaked light is projected onto the screen S. As a result, the perfect black portion is in such a state as to be illuminated vaguely by projected light.

Should the image signal control circuit 21 determine that approximately 95% or more of the image signals, in other words more than 95% of the liquid crystal cells that are being driven by the image signals, are being driven at an intensity level lower than 70% of the maximum intensity level, the image signal control circuit 21 stores the illuminance of the projected image at the moment, i.e. the illuminance prior to reduction of the size of the opening of the aperture 16, and the diaphragm mechanism drive control circuit 22 drives the motor so that the size of the opening of the aperture 16 becomes 70% of the area when the aperture 16 is fully open. After the size of the opening of the aperture 16 reaches 70% of the area of the fully open aperture 16, the image signal control circuit 21 increases the intensity of the image signals so that the illuminance of the projected image detected by the projected image illuminance detecting circuit 25 becomes the same as the illuminance prior to the reduction of the size of the opening of the aperture 16.

Rather than depending on the illuminance of a projected image, control may be performed by increasing the overall intensity of the image signals by 10% of the average intensity of the image signals.

Another way of control is to limit the part that exceeds the maximum level within 5% of the entire image signals when increasing the level of the image signals. When the overall intensity of the image signals is increased, the intensity of a part of the image signals that is already at a high level reaches the maximum level. As a result, the image projected by the light that has passed through the liquid crystal cells corresponding to such a part has no hue, in other words, it is white. Such a state is called halation and impairs the quality of the projected image. Therefore, in order to reduce halation and thereby prevent reduction in the image quality, the image signals are controlled so as to limit the part where the intensity of the image signals exceeds the maximum level, for example within 5% of the entire projected image as in the case of the embodiment described above.

As described above, when the image signals input into the liquid crystal panels 3 are at a low intensity level, the image quality can be improved by reducing the size of the opening of the aperture 16 of the diaphragm mechanism 14 and increasing the intensity level of the image signals so as to increase the contrast while maintaining the illuminance of the projected image at the level identical to that prior to the reduction of the size of the opening of the aperture 16.

Reduction of the size of the opening of the aperture 16 reduces the quantity of the light that reaches the screen S via the liquid crystal panels 3, resulting in reduced illuminance of the projected image as well as darker perfect black portion. Therefore, increasing the intensity level of image signals input into the liquid crystal panels 3 while maintaining the reduced size of the aperture increases the illuminance of the projected image, in other words the entire signals except for the perfect black portion. As a result, a projected image with a high contrast is obtained.

How the intensity of the image signals and the size of the opening of the aperture 16 should be controlled in order to improve the overall image quality including contrast, in other words how much the size of the opening of the aperture 16 should be reduced and to what degree the intensity level of the image signals should be increased when the intensity of the image signals is a certain degree lower than the maximum level, depends on various factors, such as distribution of the intensity of the image signals, the brightness of a lamp serving as the light source, etc. Therefore, the control criteria are not limited to those described in the foregoing paragraphs; they should be determined by a sensory test or other appropriate means.

Figure 4:
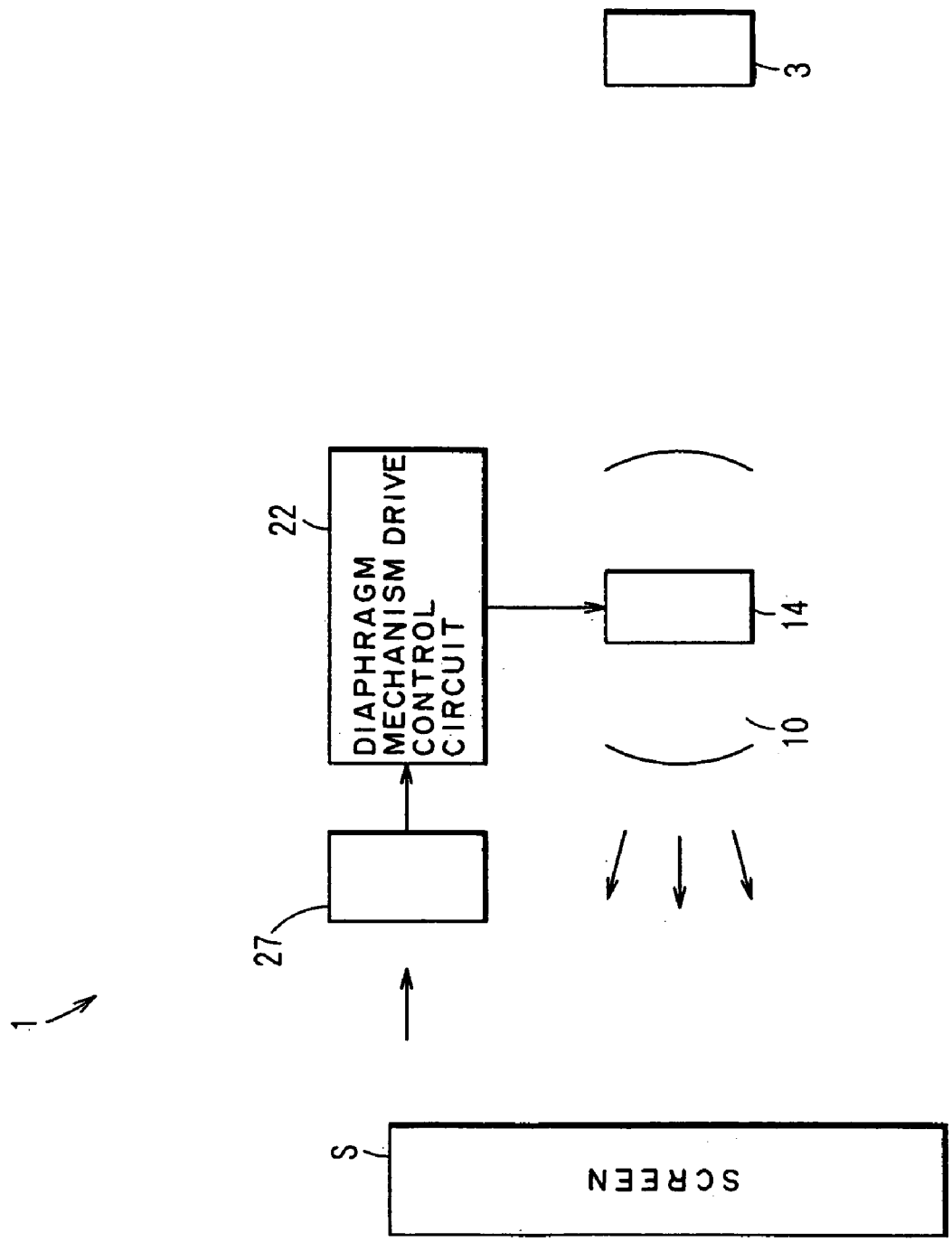
FIG. 4 is a schematic illustration of a fourth embodiment of a projector of the invention.

Next, the fourth embodiment of the projector 1 is explained, referring to FIG. 4.

The fourth embodiment calls for detecting an object between the projection lens 10 and the screen S and opening or closing the aperture 16 of the diaphragm mechanism 14 in accordance with the presence or absence of such an object.

To be more specific, an object detecting sensor 27 is connected to a diaphragm mechanism drive control circuit 22, which serves to adjust the size of the aperture 16 of the diaphragm mechanism 14 by controlling the diaphragm mechanism 14, so that the diaphragm mechanism drive control circuit 22 receives signals from the object detecting sensor 27. The object detecting sensor 27 may be, for example, a so-called infrared triangulation device, which comprises a light emitting section and a light receiving section for infrared light. Should signals from the object detecting sensor 27 indicate presence of an object within a distance of, for example, 50 cm in front of the projection lens 10, the diaphragm mechanism drive control circuit 22 drives the motor to reduce or close the size of the opening of the aperture 16 of the diaphragm mechanism 14.

As described above, when there is an object between the projection lens 10 and the screen S, the influence that light exerts on the object can be prevented by closing off the aperture 16 of the diaphragm mechanism 14. Should, for example, a person look in the projection lens 10 in the course of projecting an image, the diaphragm mechanism 14 closes off the aperture 16 to prevent the projected light from directly entering the human eye. The present embodiment is thus capable of limiting undesirable influence of light on a human eye or the like.

Figure 5:
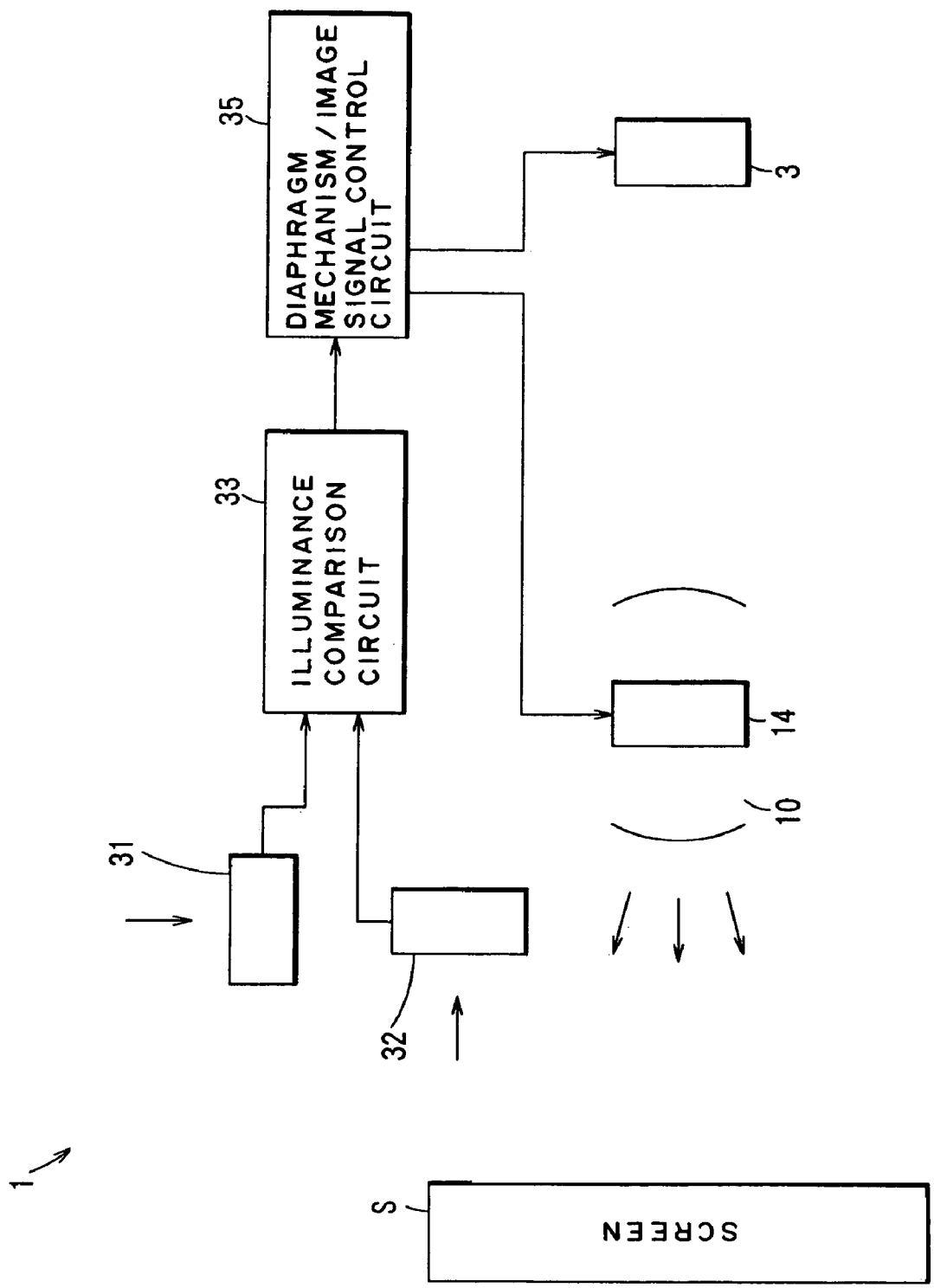
FIG. 5 is a schematic illustration of a fifth embodiment of a projector of the invention.

Next, the fifth embodiment of the projector 1 is explained, referring to FIG. 5.

The fifth embodiment calls for comparing the illuminance of the ambient light around the projector 1, in other words, for example, the illuminance in the room, with the illuminance of a projected image on the screen S, and, in accordance with the difference between these illuminances, determining the size of the opening of the aperture 16 of the diaphragm mechanism 14 as well as the intensity level of the image signals input to the liquid crystal panels 3 so as to improve the image quality.

The structure according to the fifth embodiment includes a first photoelectric element 31, a second photoelectric element 32, an illuminance comparison circuit 33, and a motor/image signal control circuit 35. The first photoelectric element 31 serves as an ambient light illuminance detecting means for measuring ambient light illuminance, i.e. the illuminance in the room in which projection is performed. The second photoelectric element 32 serves as a projected image illuminance detecting means for measuring illuminance of an image projected on the screen S. The illuminance comparison circuit 33 serves as an illuminance comparing means for comparing an illuminance detected by the first photoelectric element 31 and an illuminance detected by the second photoelectric element 32. The motor/image signal control circuit 35 serves as a diaphragm mechanism/image signal control means for controlling intensity of image signals input into the liquid crystal panels 3 and the size of the opening of the aperture 16 of the diaphragm mechanism 14 in accordance with a result of comparison by the illuminance comparison circuit 33. The motor/image signal control circuit 35 also functions as an image signal control circuit 21, which serves as an image signal control means, and a diaphragm mechanism drive control circuit 22, which serves as a diaphragm mechanism drive control means. In order to control the diaphragm mechanism 14 and the liquid crystal panels 3 in accordance with illuminance differences resulting from comparison, the motor/image signal control circuit 35 includes a correlation table which stores predetermined control criteria to control the size of the opening of the aperture 16 of the diaphragm mechanism 14 and the intensity level of image signals according to illuminance differences.

Based on signals from the two photoelectric elements 31, 32, the illuminance comparison circuit 33 compares the illuminance in the room and the illuminance of the image projected on the screen S. Based on the illuminance difference resulting from the comparison and referring to the correlation table, the motor/image signal control circuit 35 determines the size of the opening of the aperture 16 of the diaphragm mechanism 14 and the intensity level of the image signals. In accordance with the determined values, the motor/image signal control circuit 35 drives the motor of the diaphragm mechanism 14 and changes the intensity level of the image signals. The contents of the aforementioned correlation table are set so that, when the illuminance of the projected image on the screen S is not intense enough with respect to the illuminance of the light in the room, the motor/image signal control circuit 35 increases the intensity of the image signals and drives the motor in such a direction as to reduce the size of the opening of the diaphragm mechanism 14.

When the illuminance of an image projected on the screen S is not sufficiently intense with respect to the illuminance in the room, the difference in level of illuminance between the projected image and the perfect black portion is small, resulting in the projected image with low contrast. With the configuration of the embodiment described above, however, the image quality can be improved in such a situation by reducing the size of the opening of the diaphragm mechanism 14 to increase the contrast of the project image and setting the intensity of image signals at a high level to prevent reduction in illuminance of the projected image regardless of the reduced size of the opening of the diaphragm mechanism 14.

The contrast of a projected image is dependent on not only such factors as stray light inside the lens barrel 11 and the aberration of the lens but also other factors, including a sensory aspect, such as an observer's response to the brightness of the illuminance in the room and the illuminance of a projected image on the screen S. Therefore, specific criteria in the correlation table, which determines the relationship between the size of the opening of the diaphragm mechanism 14 and the intensity level of an image signal, should be set, taking into consideration results of sensory tests or the like.

The embodiment described above calls for detecting both the level of illuminance in the room and the illuminance of a projected image on the screen S. However, as the illuminance in the room exerts an greater influence on the contrast of a projected image than does the illuminance of the projected image on the screen S, the contrast of the projected image can be improved while maintaining the same level of illuminance by detecting the level of illuminance in the room alone and setting the size of the opening of the diaphragm mechanism 14 and the intensity level of image signals in accordance with the detected illuminance in the room.

The higher the level of illuminance in the room, the smaller the difference in level of illuminance between the light in the room and the projected image, resulting in reduced contrast of the projected image. In an alternative arrangement, contrast of a projected image may be improved by increasing the size of the opening of the diaphragm mechanism 14 as well as the illuminance of the projected image when the level of illuminance in the room is higher than a preset level or when the difference in level of illuminance between the light in the room and the projected image is smaller than a preset value. Although increasing the size of the opening of the diaphragm mechanism 14 makes the contrast of the project image prone to reduction, the reduction in the contrast can be limited by determining the shape of the aperture 16 of the diaphragm mechanism 14 in accordance with the field angle characteristics of the liquid crystal panels 3.

In either one of the second embodiment or the fifth embodiment, the projection lens 10 may be arranged telecentric to rays of light emitted from the liquid crystal panels 3 with the aperture 16 of the diaphragm mechanism 14 positioned so that the principal rays A intersect with the optical axis B. Arranging the projection lens 10 as described above permits rays of light emitted from various locations on the liquid crystal panels 3 to be shut out in a symmetrical manner with respect to the optical axis B, thereby limiting reduction in telecentric properties and, consequently, easily ensuring both telecentricity and improved contrast. Furthermore, by forming the aperture 16 of the diaphragm mechanism 14 in such a shape as to ensure a sufficiently high contrast in accordance with contrast characteristics with respect to directions and angles of incidence to the liquid crystal panels 3, contrast can be easily improved, compared with a structure that includes a circular aperture, while reduction in illuminance of a projected image is prevented.

Next, an explanation is given on the field angle characteristics of the liquid crystal panels 3. FIGS. 6 through 9 show measuring methods, and FIG. 10 shows results of measurements.

The measurement was performed under the following basic conditions: driving voltages of $HV_{DD}=15.5$ V, $VV_{DD}=15.5$ V, $VVC_{DD}=7.0$ V, and $V_{com}=6.6$ V, a temperature of 25 □ the measurement point being one point at the center of the picture frame, a measurement system I and a measurement system II described below as the measurement systems, and video input signal voltages with respect to a signal amplitude being $V_{sig}=7.0$ V±$V_{AC}$[V].

Figure 6:
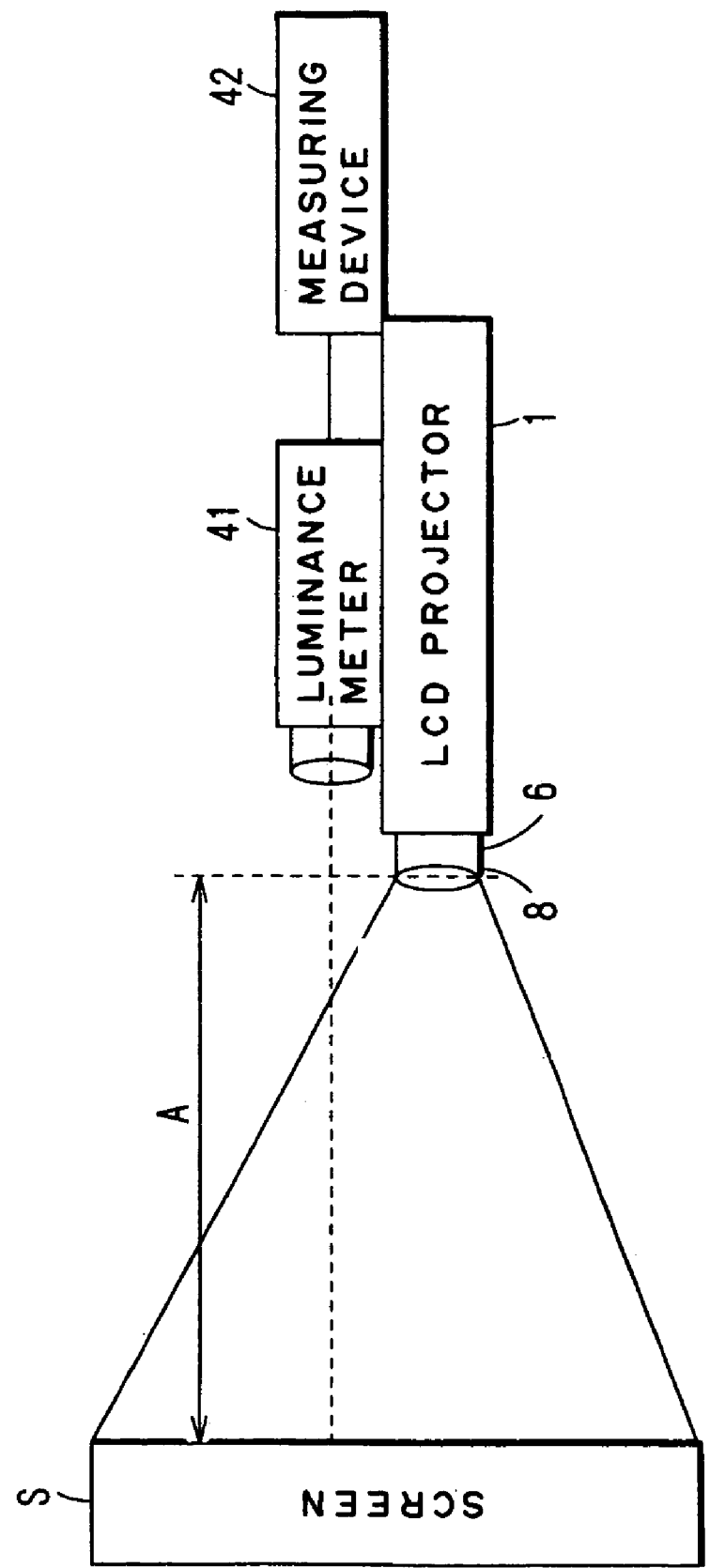
FIG. 6 shows a measurement system for measuring the field angle characteristics of liquid crystal panels of said projector.

FIG. 6 shows the measurement system I, wherein an image projected on the screen S, which is disposed at a location of A=2000 mm from the projector 1, is measured by means of a measuring device 42 via a luminance meter 41. The screen S is of a glass beads type with a gain of 2.8. The projection lens 10 of the projector 1 has a focal length of 80 mm and a F-number of F1.9. The light source is a 155 W metal halide lamp with a color temperature of 7500 K±500. The magnification is 24×, and the measurement diameter is 7 mm φ. EG-EG1224DU (product name of Nitto), SKN-18242T (product name of Polatechno), or a product having equivalent specifications is used as the polarizing plate.

Figure 7:
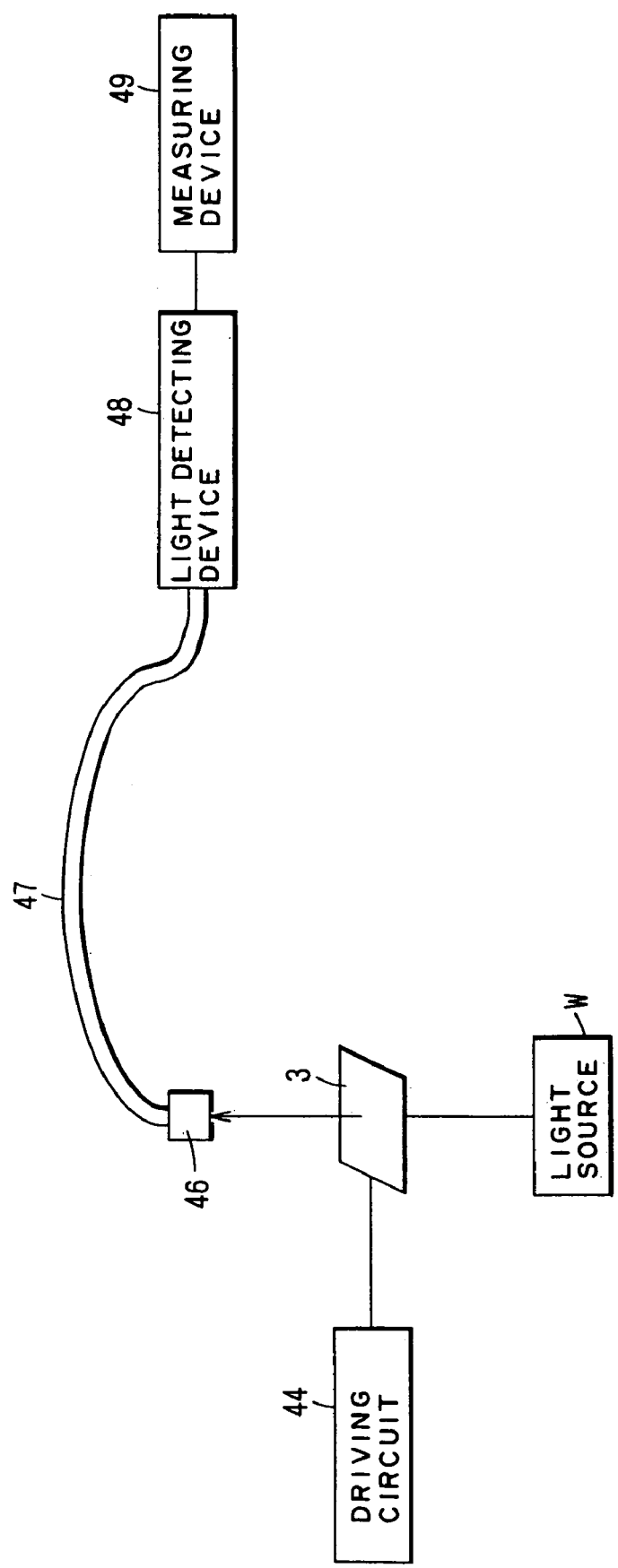
FIG. 7 shows another measurement system for measuring the field angle characteristics of said liquid crystal panels.
Figure 8:
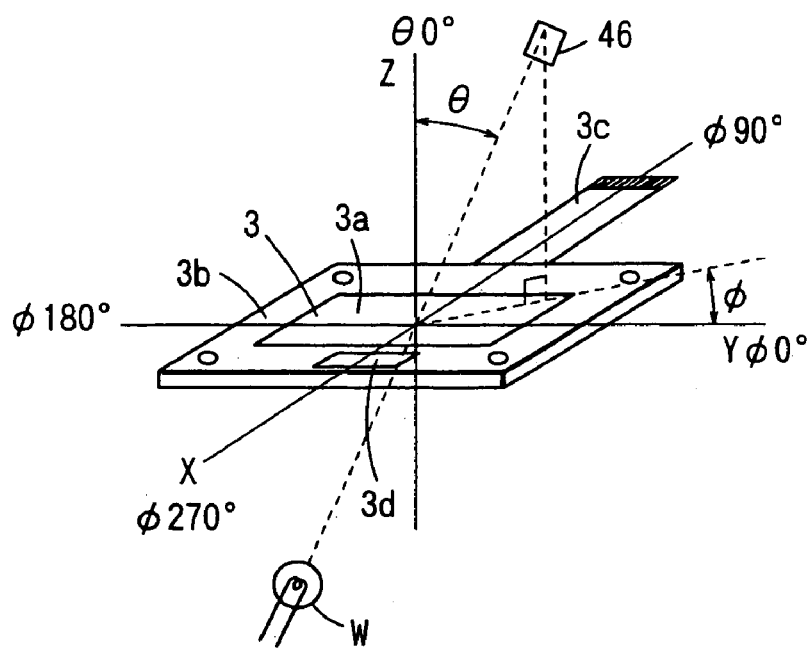
FIG. 8 shows said measurement system for measuring the field angle characteristics of said liquid crystal panels.

FIGS. 7 and 8 show the measurement system II, wherein the liquid crystal panels 3 are driven by a driving circuit 44, and light emitted from a movable light source W is passed through the liquid crystal panels 3 and received by a light receiving lens 46, which is disposed so as to face towards the light source and be capable of moving around the center of the liquid crystal panels 3. The light receiving lens 46 is connected to a light detecting device 48 via an optical fiber 47. The light detecting device 48 is connected to a measuring device 49.

In FIG. 8, reference code 3a represents the main body portion of the liquid crystal panels 3, 3b a frame portion surrounding the main body portion, 3c a flexible wiring, and 3d a mark.

Figure 9:
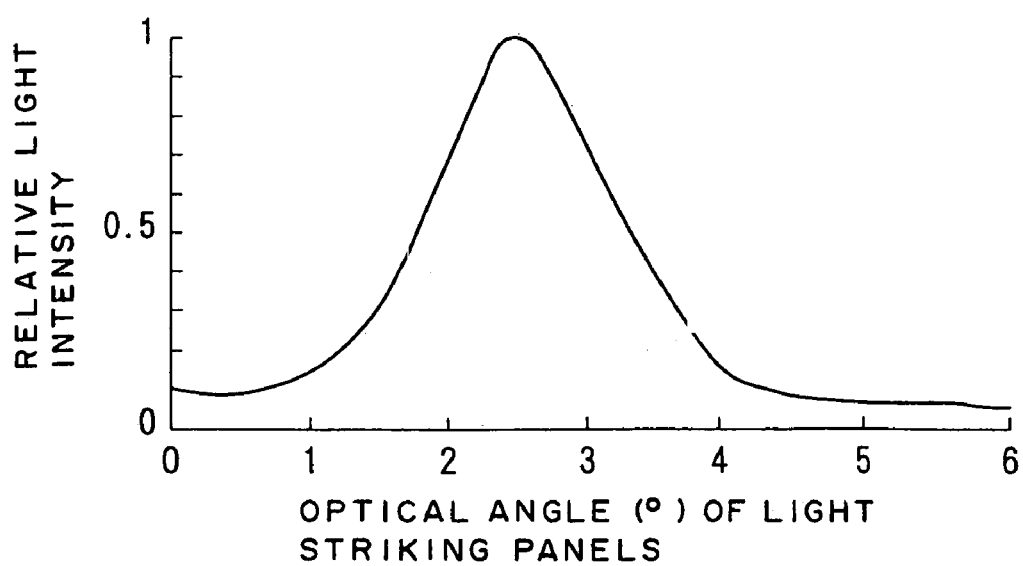
FIG. 9 is a graph showing the relationship between optical angles and relative light intensities of rays of light entering said liquid crystal panels.
Figure 10:
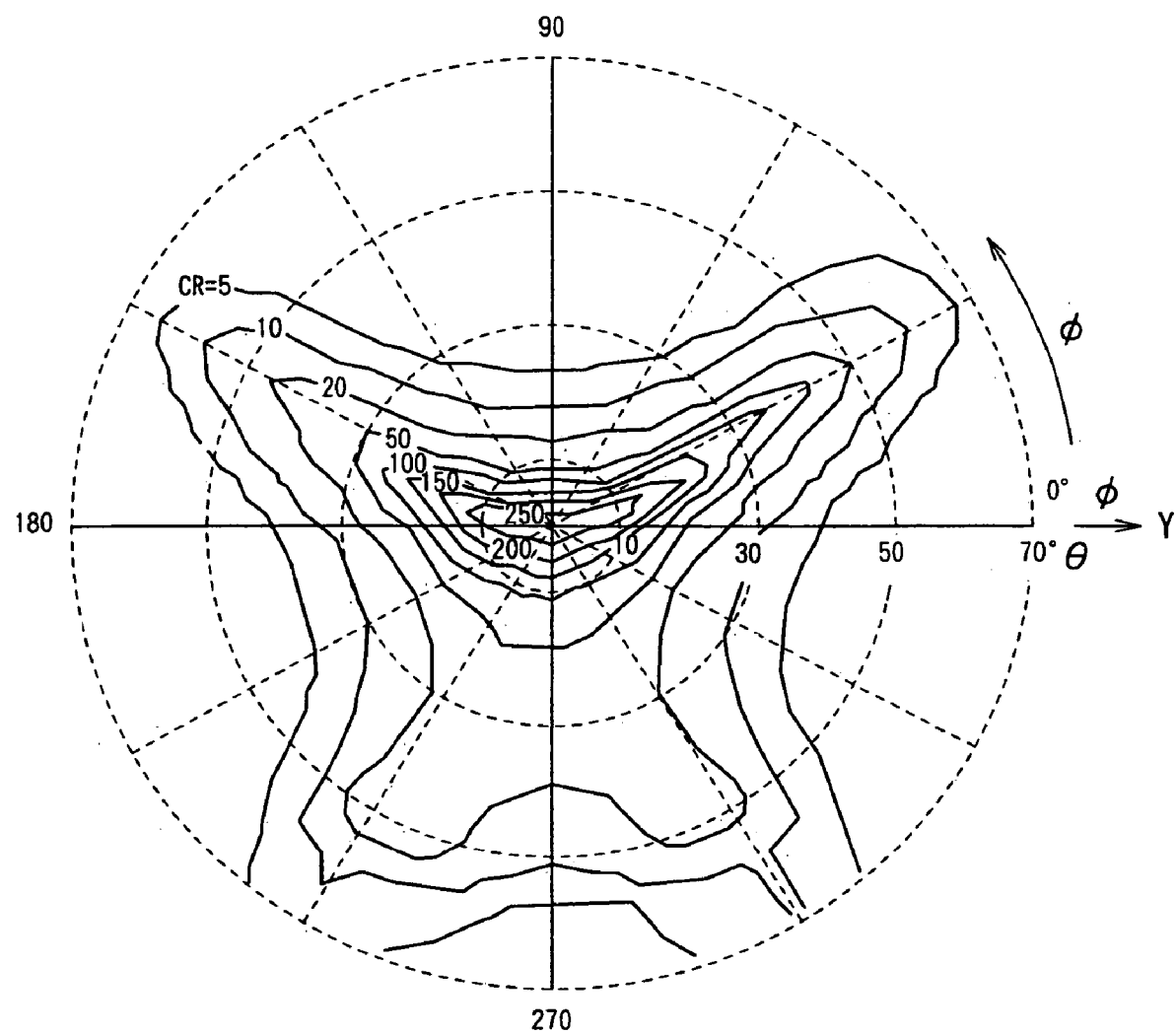
FIG. 10 is a graph showing results of measurement of the field angle characteristics of said liquid crystal panels.

FIG. 9 is a graph showing the relationship between optical angles (°) of light that strikes the liquid crystal panels 3 and relative light intensities.

In FIG. 10, reference code CR represents a contrast shown in the term of ratio. A contrast CR is found by measuring two factors in the measurement system I, i.e. a surface brightness L (white) at the center of the screen S when the input signal amplitude ($V_{AC}$) is 0.5 V and a surface brightness L (black) at the center of the screen S when the input signal amplitude ($V_{AC}$) is 4.5 V, and computing CR based on the equation CR=L(white)/L(black).

The liquid crystal panels 3 functions as a light shutter by controlling the arrangement of liquid crystal molecules and permitting changes in the arrangement to be seen by means of combination with a polarizing plate. The characteristics of the liquid crystal panels 3 vary depending on angles of incidence of light. In particular, with regard to contrast of light that has passed through the liquid crystal panels 3, the characteristics of the liquid crystal panels 3 are dependent on not only the angle of incidence but also the direction of incidence. To be more specific, generally speaking, the higher the angle of light entering the liquid crystal panels, in other words the closer to a right angle (the θ with respect to the Z axis is small), the higher the contrast. For this reason, it is a common practice to improve contrast of an image by reducing the diameter of a circular aperture so as to shut out light that enters at a low incident angle and therefore would reduce the contrast. However, the characteristics of the liquid crystal panels 3 vary also with direction of incidence, i.e. (p with respect to the Y axis. As is evident from the result of the measurement shown in FIG. 10, in a part having a relatively high contrast, lines that connect areas having the same level of contrast form a substantially triangular shape, while lines that connect areas having the same level of contrast in a part having a relatively low contrast form a square with four curved sides.

In order to solve the above problem, the shape of the part having a relatively high contrast is taken into consideration in the first embodiment shown in FIG. 2 so that the aperture 16 is formed in a substantially triangular shape. In other words, the aperture 16 of the diaphragm mechanism 14 is formed in a shape appropriate for the field angle characteristics so that the opening of the aperture 16 corresponds to the part through which light beams having a high contrast pass. By thus forming the aperture 16 in such a shape as to substantially increase the proportion of the light passing through the aperture 16 that has a high contrast, it is possible to ensure that a projected image has both a sufficiently high contrast and intense illuminance. Unlike a circular aperture, which is inevitably subject to the problem of a reduced illuminance when reducing the diameter of the aperture to permit only the light that has a high contrast to pass through, the structure of the first embodiment permits a large amount of the light having a high contrast to pass through the diaphragm mechanism 14 while maintaining a large aperture diameter, which corresponds to the size of the opening of the diaphragm mechanism 14 through which light passes. The embodiment is thus capable of simultaneously achieving both a high contrast and a sufficiently intense illuminance and thereby easily improving the performance characteristics of the projector.

In other words, as the aperture 16 is comprised of a center portion, which has a conventional circular shape, and projecting portions C, each of which extends from the center portion along a part having a high contrast, the illuminance of an image is intensified while reduction in contrast is limited. The embodiment is thus capable of simultaneously achieving both a high contrast and a sufficiently intense illuminance and thereby easily improving the performance characteristics of the projector.

In order to improve the illuminance of a projected image as much as possible and obtain a simple shape so as to reduce the production costs, the first embodiment shown in FIG. 2 takes into consideration the shape of the part having a relatively high contrast and calls for forming the aperture 16 in a substantially triangular shape that includes projecting portions C projecting in three directions. However, the invention is not limited to such a configuration; the aperture 16 may be formed in any other appropriate shape.

Figure 11:
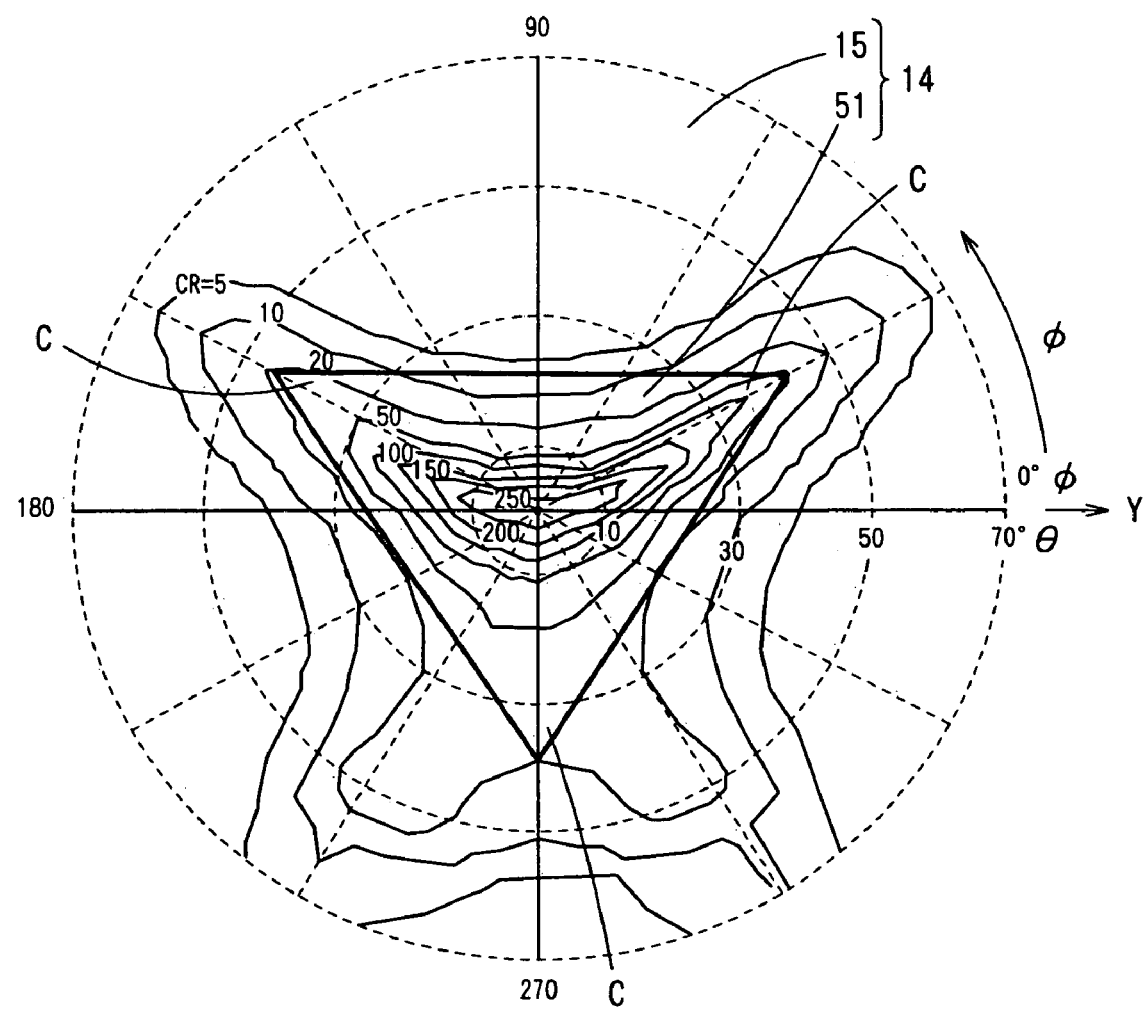
FIG. 11 is a schematic illustration of diaphragm mechanism to explain a sixth embodiment of a projector of the invention.

An example of other configurations of the aperture is offered by a sixth embodiment shown in FIG. 11, which takes into consideration the shape of the part having a relatively high contrast and aims at improving contrast rather than illuminance. In order to achieve this objective as well as obtain a simple shape at reduced production costs, the sixth embodiment offers a substantially triangular aperture 51 having projecting portions C that project in three directions.

Figure 12:
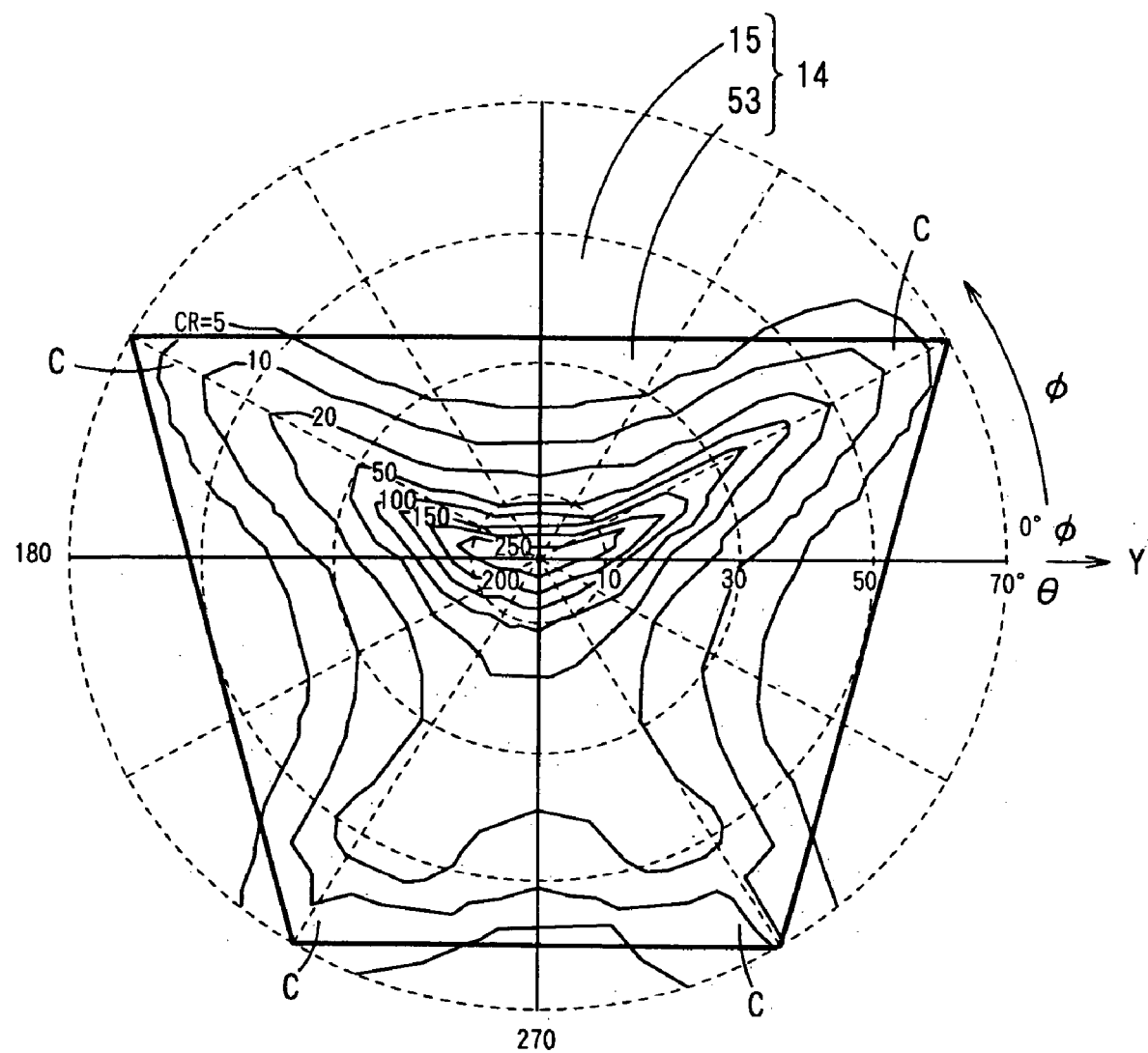
FIG. 12 is a schematic illustration of diaphragm mechanism to explain a seventh embodiment of a projector of the invention.

Another example is offered by a seventh embodiment shown in FIG. 12, which also takes into consideration the shape of the part having a relatively low contrast and aims at improving illuminance as much as possible. In order to achieve this objective, the seventh embodiment offers a substantially trapezoidal aperture 53 having projecting portions C that project in four directions.

Figure 13:
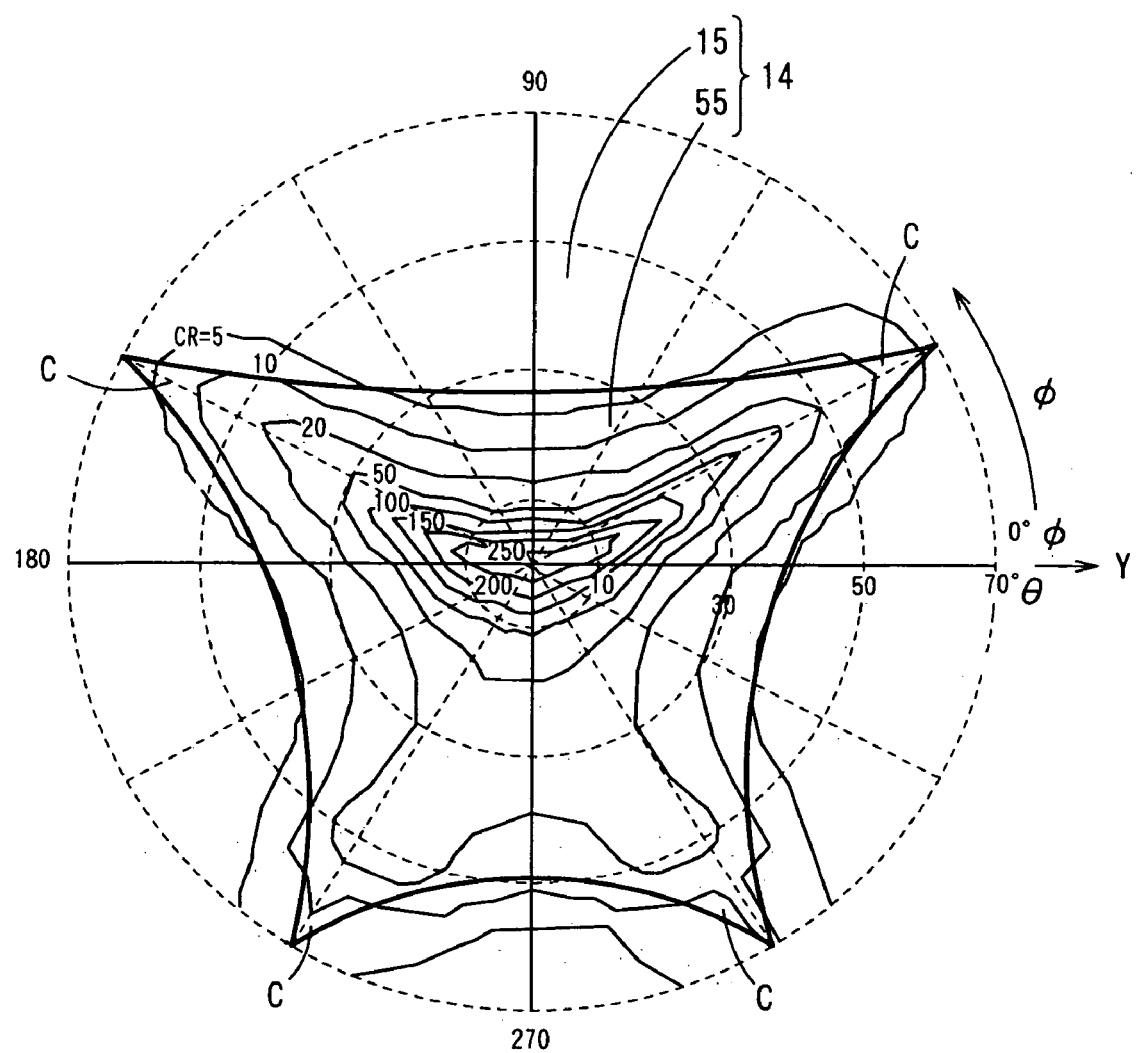
FIG. 13 is a schematic illustration of diaphragm mechanism to explain an eighth embodiment of a projector of the invention.

Yet another example is offered by an eighth embodiment shown in FIG. 13, which also takes into consideration the shape of the part having a relatively low contrast and aims at improving contrast and illuminance as much as possible. In order to achieve this objective, the seventh embodiment offers a substantially trapezoidal aperture 55 of which the four sides curve inward approximately along lines that connects areas having the same level of contrast, with projecting portions C projecting in four directions.

Figure 14:
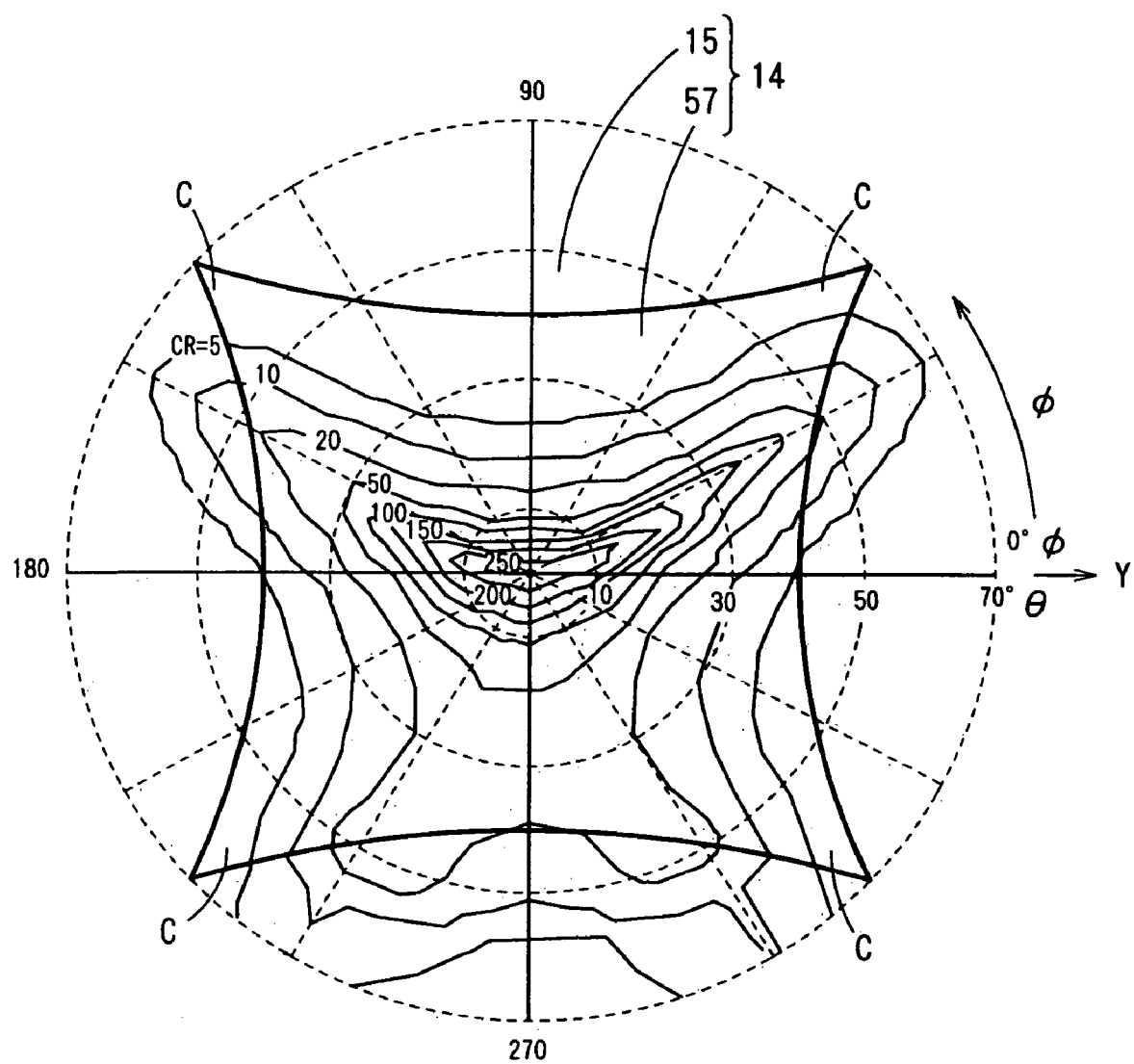
FIG. 14 is a schematic illustration of diaphragm mechanism to explain a ninth embodiment of a projector of the invention.

Yet another example is offered by a ninth embodiment shown in FIG. 14, which also takes into consideration the shape of the part having a relatively low contrast and aims at improving contrast and illuminance as much as possible and averaging out the quantity of light of a projected image. In order to achieve this objective, the seventh embodiment offers a substantially square aperture 57 of which the four sides curve inward approximately along lines that connects areas having the same level of contrast, with projecting portions C projecting in four directions.

Should the field angle characteristics of the liquid crystal panels 3 serving as the display device differ, the aperture 16 of the diaphragm mechanism 14 may have a different shape in accordance with the characteristics of the liquid crystal panels 3.

Although the invention is explained as above referring to the embodiments wherein the transmission type liquid crystal panels 3 are used as the display device, the invention is not limited to such a feature; the invention is applicable to various display devices that use a plurality of pixels.

As a result of provision of a diaphragm mechanism, the lens device of this invention is capable of increasing the F-number (in other words reducing the view angle) so as to shut out the light that passes near the perimeter of the lens, which is the area prone to the influence of lens aberration. By thus forming a projection image of the light that passes near the center of the lens and is therefore less prone to lens aberration, the lens device claimed in claim 1 is capable of improving the contrast of the projected image. As the lens device is arranged telecentric to rays of light emitted from the display device, the principal rays of light emitted from various locations of the display device converge at a single point and intersect with the optical axis. Providing the diaphragm mechanism with an aperture at such a position that the principal rays intersect with the optical axis permits rays of light emitted from various locations on the display device to be shut out in a symmetrical manner with respect to the optical axis, thereby limiting reduction in telecentricity and, consequently, easily ensuring both telecentricity and improved contrast.

The shape of the aperture of the diaphragm mechanism of the lens device is determined in accordance with contrast characteristics with respect to directions and angles of incidence to the display device so as to ensure a sufficiently high contrast. Therefore, this lens device is capable of limiting reduction in illuminance of a projected image and also easier to improve the contrast of a projected image than is a structure that includes a circular aperture. The diaphragm mechanism of the lens device may be designed such that the size of the opening of its aperture is adjustable, thus facilitating the adjustment of the contrast and the brightness of a projected image. As a result of inclusion of such a lens device, a projector claimed in claim 4 easily ensures both telecentricity and improved contrast.

Should the intensity of image signals input into the display device be at a low level, a projector according to this invention is capable of increasing the contrast of a projected image while maintaining its illuminance by reducing the size of the opening of the aperture of the diaphragm mechanism and increasing the intensity of the image signals.

Should there be an object between the lens device and the screen, such a projector is capable of limiting the impact light has on the object by reducing the dimension of the aperture of the diaphragm mechanism.

Should the illuminance of an image projected on the screen is not sufficiently intense with respect to the level of illuminance in the room, such a projector is capable of reducing the size of the opening of the diaphragm mechanism so as to increase the contrast of the projected image and setting the intensity of the image signals at a high level so as to limit reduction in the illuminance of the projected image.

As the lens device of a projector of this invention may be arranged so as to be telecentric to rays of light emitted from the display device, the principal rays of light emitted from various locations of the display device converge at a single point and intersect with the optical axis. Therefore, by providing the diaphragm mechanism with an aperture at such a position that the principal rays intersect with the optical axis, this projector also permits rays of light emitted from various locations on the display device to be shut out in a symmetrical manner with respect to the optical axis, thereby limiting reduction in telecentricity and, consequently, easily ensuring both telecentricity and improved contrast.

The shape of the aperture of the diaphragm mechanism of such a projector is determined in accordance with contrast characteristics with respect to directions and angles of incidence to the display device so as to ensure a sufficiently high contrast. Therefore, such a projector is also capable of limiting reduction in illuminance of a projected image and also easier to improve the contrast of a projected image than is a structure that includes a circular aperture and may facilitate the improvement of image quality by improving the contrast of the image while ensuring telecentricity even in cases where the projector includes liquid crystal panels whose contrast characteristics are polarized with respect to the direction and angle of incidence.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A projector comprising,
a light source;
a display device to modulate light emitted from the light source;
a lens device to project light emitted from said light source via said display device, wherein said lens device comprises a diaphragm mechanism formed having an aperture;
an ambient light illuminance detector to measure illuminance of ambient light from outside of the projector;
a projected image illuminance detector to measure illuminance of an image projected on the screen;
an illuminance comparator to compare an illuminance detected by said ambient light illuminance detector and an illuminance detected by said projected image illuminance detector;
a diaphragm mechanism to control a size of an opening of the aperture of the diaphragm mechanism in accordance with a result of a comparison by the illuminance comparator; and
an image signal controller to control an intensity of image signals input into the display device in accordance with a result of a comparison by the illuminance comparator;
wherein the lens device is arranged telecentric to rays of light emitted from the display device and comprises a diaphragm mechanism having an aperture at such a position that the lens device causes principal rays of light emitted from various location on the display device to intersect with the optical axis.

2. The projector as claimed in claim 1, wherein the shape of the aperture of the diaphragm mechanism is determined in accordance with contrast characteristics with respect to directions and angles of incidence of light emitted from the display device onto the lens device so as to ensure a sufficiently high contrast.

3. The projector as claimed in claim 1, wherein the display device is comprised of liquid crystal panels.

4. The projector as claimed in claim 1, wherein the diaphragm mechanism and the image signal controller are included in a single unit.

* * * * *

UNITED STATES PATENT AND TRADEMARK OFFICE
CERTIFICATE OF CORRECTION

PATENT NO. : 7,114,814 B2
APPLICATION NO. : 11/328082
DATED : October 3, 2006
INVENTOR(S) : Hiroki Abe et al.

It is certified that error appears in the above-identified patent and that said Letters Patent is hereby corrected as shown below:

In Column 11, Line 51, delete "(p" and replace with --φ--.

Signed and Sealed this

Twenty-fourth Day of April, 2007

JON W. DUDAS
*Director of the United States Patent and Trademark Office*